INVENTOR.
HARRY F. CALDWELL
JOHN R. DAVIES
BY
ATTORNEYS

INVENTORS
HARRY F. CALDWELL
JOHN R. DAVIES
BY
*Price & Heneveld*
ATTORNEYS

INVENTORS
HARRY F. CALDWELL
JOHN R. DAVIES
BY
ATTORNEYS 3,112,238
LABELING MACHINE
Harry F. Caldwell, Cedar Springs, and John R. Davies, Grand Rapids, Mich., assignors to Oliver Machinery Company, Grand Rapids, Mich., a corporation of Michigan
Filed June 21, 1961, Ser. No. 118,736
4 Claims. (Cl. 156—499)

This invention concerns labeling machines, and more particularly machines used in conjunction with packaging machines for affixing thermally adherescent labels to a continuous web of packaging material.

It is customary to provide continuous-web automatic package wrapping machines with a labeling device which receives labels from a supply roll and applies them at predetermined intervals to the continuous web or film of wrapping material which is then cut to size and used by the automatic packaging mechanism. The wrapping or packaging material used in such machines is usually classified as either class I or class II materials. Class I materials are those materials which can withstand sealing temperatures of about 400 degrees Fahrenheit without melting or otherwise deteriorating. Cellophane, "Mylar," and paper are examples of class I materials. Class II materials are those which are adversely affected by sealing temperatures below 400 degrees Fahrenheit. These materials include, for example, polyethylene, "Saran," "Paracote" (a micro-wax and rubber blend), and similar materials.

Labeling of class I materials can be accomplished in a well-known manner by using labels with a thermally adherent coating, and applying the labels to the packaging material under high pressure and heat.

One prior art machine using this principle, for example, guided the wrapping material around a conveying roller with a hot section in its surface, applied labels in register with the hot section of the roll, and pressed the label against the sheet by means of a weight roller as the label passed adjacent to the hot section of the conveying roller. This method had two significant limitations: First, the conveying roller had to be changed for each different package size; and second, at speeds in excess of approximately 150 labels per minute, it was impossible to get the label hot enough for proper adhesion during the short time (necessarily less than one packaging cycle) during which it was exposed to heat from the roller to obtain adequate adhesion, without raising the temperature of the roller to the point of creating a fire hazard.

Class II materials, of course, were very hard to handle by the above described method because of their tendency to melt when they came in contact with the hot roller. One suggested solution to this problem was to use labels with a thermoplastic adhesive, heating the adhesive by direct contact with a heater roller, removing the hot label from the heater roller, and pressing it against the packaging material strip between two cold rollers. This method, however, produced unreliable registration of the labels because of the erratic adhesion of the labels to the heater roller, and furthermore it created a problem of contamination of the roller surface with melted adhesive that required extensive and frequent cleaning.

The present invention solves these problems by providing a machine which is capable of accurately labeling a continuous web of either class I or class II materials at high speeds by using labels with a thermoplastic adhesive, heating the adhesive through the paper of the label while holding the paper side of the label against an intermittently rotating heater shoe by vacuum means, and then transferring the label onto the web, either by pressing the label directly against the web, or by stripping the label from the heater shoe and applying it to the packaging material at a point well spaced from the heater shoes, depending on the material used. In the latter case, the final sealing is accomplished by compressing the label and packaging material strip between two cold rollers. The apparatus of this invention is so constructed that the labels are held against the heater shoe for a considerable period of time (always in excess of one packaging cycle; usually two cycles or more), thus permitting the use of lower heater temperatures and higher operating speeds of the machine than were previously possible. Furthermore, whereas in prior, continuously rotating devices the position of the labels on the packaging material sheets cut to size by the labeler itself was dictated by the size and arrangement of the components of the labeling machine and was therefore very hard to alter, the present invention provides a sectioned heater mechanism which rotates intermittently in accordance with a demand signal given by the packaging machine once during each packaging cycle, and stops after a label has been applied until the next demand signal occurs. Thus, the necessary spacing between labels on the packaging material web is automatically obtained merely by adjusting the length of the packaging cycle on the packaging machine, and the time-consuming roller exchange in the labeler for different-sized packages is eliminated.

Similarly, the use of different sizes of labels on the same machine in the prior art required extensive adjusting of the machine while it was shut off. In the machine of this invention, however, the use of labels of a substantially different size requires merely the quick and easy exchange of the heater shoes and index wheel coupled possibly with a positioning adjustment which can be performed while the machine is in operation.

The primary purpose of this invention is to provide a labeling machine capable of accurately and efficiently labeling a continuous web of either class I or class II packaging materials at high speeds without damage to the strip.

It is a further object of the invention to provide a labeling machine permitting the use of many different sizes and spacings of labels on which label positioning and registration adjustments can be made while the machine is running.

It is still another object of this invention to provide a labeling machine for use with labels having a thermoplastic adhesive, in which the adhesive does not come into contact with any parts of the machine in its plastic condition, and in which the plasticizing of the thermoplastic adhesive can be achieved at relatively low temperatures even at high operational speeds of the machine.

These and other objects of this invention will become apparent from the following description, taken in connection with the accompanying drawings, in which.

Basically, the invention teaches the use, in a continuous-web labeler, of an intermittently rotating heater member with readily exchangeable shoes on which the labels are held by vacuum means with the adhesive side away from the shoes, for a time sufficient to thoroughly plasticize the thermoplastic adhesive of the labels. The hot label is then either directly pressed against the packaging material web, or it is stripped from the shoes by a stripper means when it is ready to be applied, and is guided into contact with the packaging material web to which it is to be applied. The packaging material web may selectively be maintained spaced at all times from the heater means, and the label in such a case is pressed against the strip by a cold weight roller. The intermittent motion of the heater means is designed to apply one label to the strip during each increment of motion, and is accurately controlled by an external demand signal preferably coupled to the wrapping mechanism of the packaging machine so as to occur a fixed number of times, usually once, during each packaging cycle, coupled with an automatic shut-off and brake inside the labeler for stopping the heater means in a precise predetermined angular position immediately following application of a label.

Because of the exchangeability of the shoes, means have also been provided for adjusting the centering of the labels on the heater shoes. This adjustment can be performed while the machine is running. It is accomplished by providing a flexible endless drive, such as a chain, between the heater shaft and the label feed, and providing an arrangement whereby one leg of the chain between the heater shaft and the label feed can be lengthened while the other leg is shortened, or vice versa. This adjustment, in effect, changes the angular position of the heater means at which the label will be deposited onto it. Because of the fact that the label feed motion is of necessity non-uniform (its speed varies from zero at the time when a label is severed from the continuous label strip to a maximum when the label is being discharged onto the heater shoe), the vacuum holding means are arranged to permit slippage of the label on the shoe to compensate for the motion differential between the shoe and the label when it is deposited onto the shoe.

Figure 1:
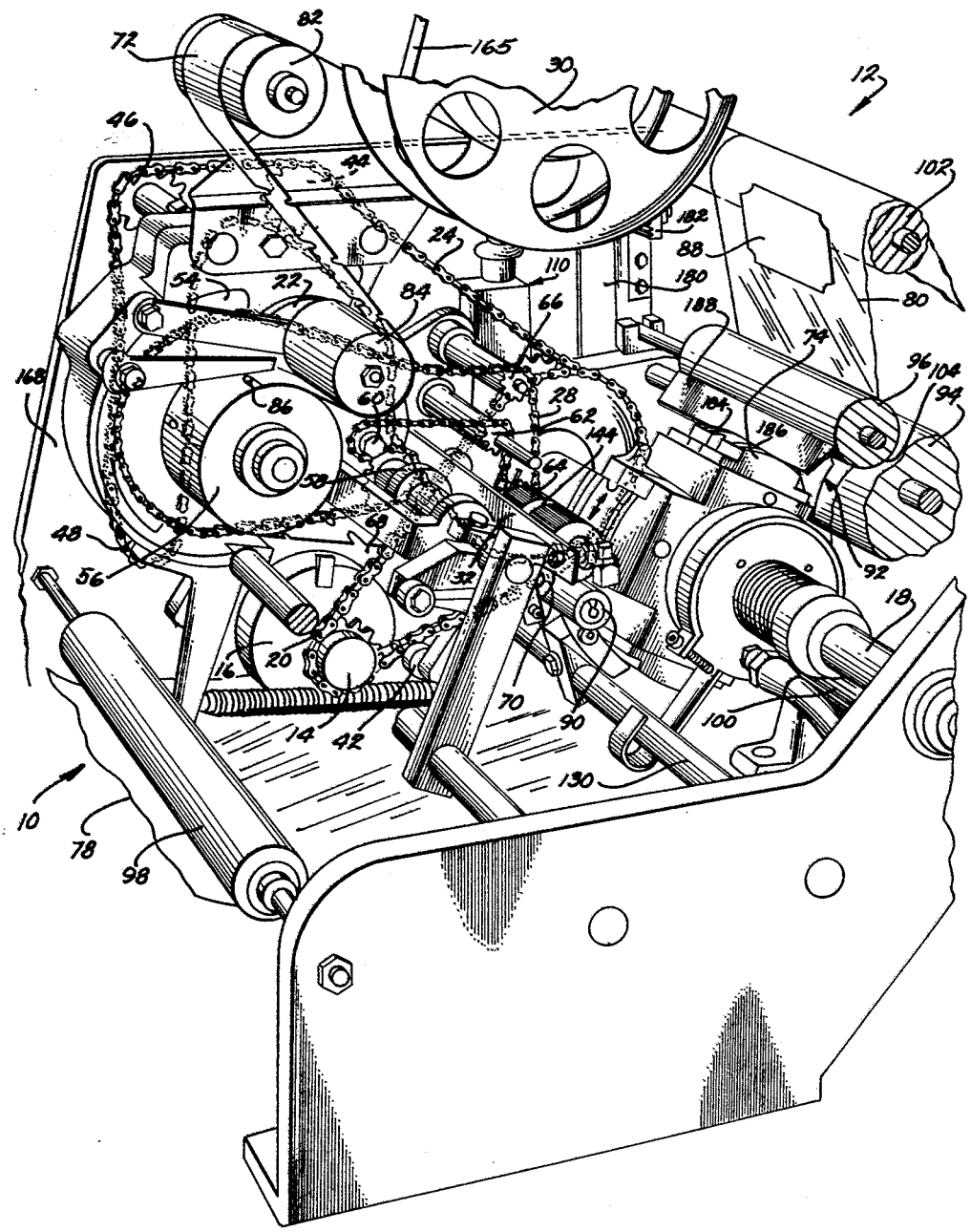
FIG. 1 is a perspective view, partly cut away, from the right-hand side of the device.

Referring now to the drawings, the overall physical arrangement of the device of this invention can best be seen in FIG. 1. Functionally, the machine can be broken down into two portions: the label feed portion 10 and the label applying portion 12. Both portions are driven from a drive shaft 14 which is powered by any appropriate means, preferably by a power take-off from the packaging machine (not shown), and is equipped with a clutch-and-brake device 16. Rotary motion is transmitted from the drive shaft 14 to the heater shaft 18 of the label applying portion 12 by a chain 20. The motion of heater shaft 18 is then transmitted in turn to the drive sprocket of the Geneva movement 22 of the label feed portion 10 by a chain 24. The Geneva drive 22 in turn imparts a non-uniform intermittent motion to the label feed roll, from which this motion is transmitted to the various conveying components of the label feed mechanism by a chain 28, and to the cutting knife 32 by a mechanical linkage. It should be understood that the conveying, cutting, and handling of the labels from the supply roll 30 to the feed roll 64 is conventional and therefore need not be explained in detail.

Figure 6:
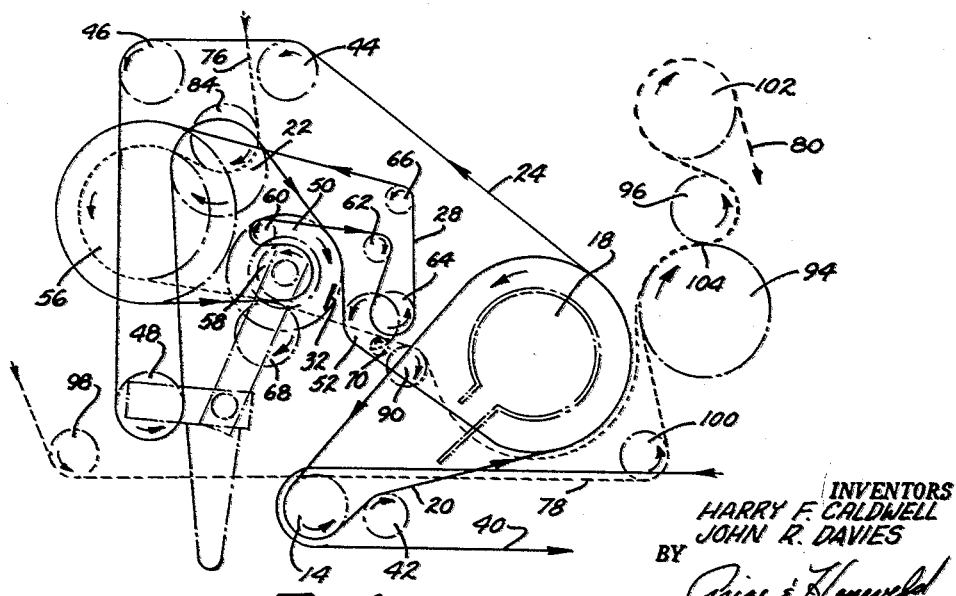
FIG. 6 is a motion flow diagram as seen from the right-hand side of the device.

The interconnection of the parts and their purpose will be better understood from a study of FIG. 6 in connection with FIG. 1. In FIG. 6, motive power is supplied to the labeling machine by a drive member 40 (not visible in FIG. 1), which may take the form of a chain continuously driven in synchronism with the packaging operation by the motor of the packaging machine (not shown). The drive member 40 drives the drive shaft 14 of the labeling machine through the intermediary of the electric brake-and-clutch arrangement 16 which permits periodic disengagement of the drive shaft 14 from the drive member 40. The motion of drive shaft 14 is transmitted to the heater shaft 18 through the chain 20 which is kept taut by the idler sprocket 42. The motion of the heater shaft 18 is in turn transmitted to the Geneva drive 22 for the label feed mechanism by the chain 24 which runs from heater shaft 18 over idler sprockets 44, 46 and spring-biased tension sprocket 48 to the Geneva drive 22, and thence back over idler sprocket 50 and the movable adjusting sprocket 52 to the heater shaft 18. Uniform rotation of the Geneva drive 22 causes it to impart the non-uniform motion required by the label feed mechanism 10 to a cam 54 (FIG. 1) associated with the label index wheel 56. The label index wheel 56 is also equipped with a sprocket which drives the chain 28 to operate the label feeding mechanism. The chain 28 runs from the index wheel 56 to the upper label advancing roll 58 over idler rolls 60, 62 to the feed roll 64, and over idler sprocket 66 back to index wheel 56. Idler rolls 68 and 70 are provided to press the labels against the advancing roll 58 and the serrated feed roll 64, respectively. The advancing roll 58 pushes the continuous label strip 72 (FIG. 1) toward knife 32, and feed roll 64 conveys the severed labels into position on the heater shoes 74. In FIG. 6, the path of the labels is designated by the dotted line 76; the path of the wrapping material web is designated by the dotted line 78; and the path of the labeled web is designated by the double dotted line 80. It will be seen that the labels travel from the label supply roll 30 (FIG. 1) over the spring biased roll 82 (FIG. 1), and over the fixed idler roll 84 to the index wheel 56 which carries locating pins 86 (FIG. 1) for accurate positioning of the labels in the feeding mechanism. The severed individual labels such as 88 (FIG. 1) travel over the bending roller 90 onto the shoes 74, where they are held by vacuum means hereinafter described, and from which they are eventually stripped by the stripper 92 (FIG. 1) which guides them against the packaging material web 78 for compressional bonding thereto between impression roller 94 and weight roller 96.

It will be understood that if the labeling machine is to handle only class I materials, the stripper 92 and weight roller 96 may be dispensed with, and the label may be pressed directly against the web 78 on the impression roller 94 by the heater shoes 74. In either case, the vacuum is removed from the shoes 74 when they reach the label-applying position, so as to allow the label to be pulled off the heater shoe.

Figure 8:
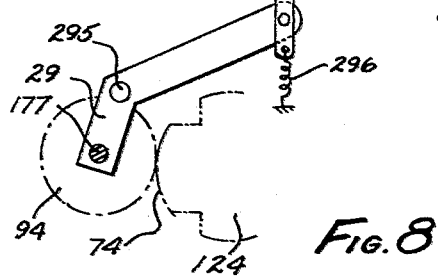
FIG. 8 is a fragmentary schematic view illustrating a modification of the device.

If the machine is to handle some of the less delicate class II materials which can safely be exposed to moderate heat for a fraction of a second, the comparatively low temperature at which the heater shoes of this machine are operated may still make it possible to apply the labels directly to the web, without providing the stripper 92 and the weight roller 96. In this case, however, it is advisable (see FIG. 8) to provide the impression roller 94 with movable bearings 294 pivotable about pin 295 and biased clockwise by a spring 296 overridable by a solenoid 298. This arrangement automatically pulls the impression roller 94 away from the heater shoes 74 when the packaging machine is stopped in order to avoid damaging the web if the machine should happen to come to a stop while a heater shoe is in close proximity to the web.

The web 78 of packaging material is brought into the labeling machine from a suitable source of supply and is directed around idler rollers 98 and 100 to the impression roller 94. All the rollers contacted by the web 78 are idler rollers; i.e. they do not drive the web 78, but rather are driven by it. The web 78 is pulled through the labeling machine by the packaging machine in a manner synchronized with the movement of drive member 40. The labeled web 80 is drawn around weight roller 96 and over register roller 102 which can be vertically moved. Since the vertical position of registering roller 102 determines the length of web 80 between the point of label application 104 and the point of entry of the web 80 into the packaging machine mechanism (not shown), the vertical adjustment of register roller 102 determines the position of the label on the finished package.

Figure 2:
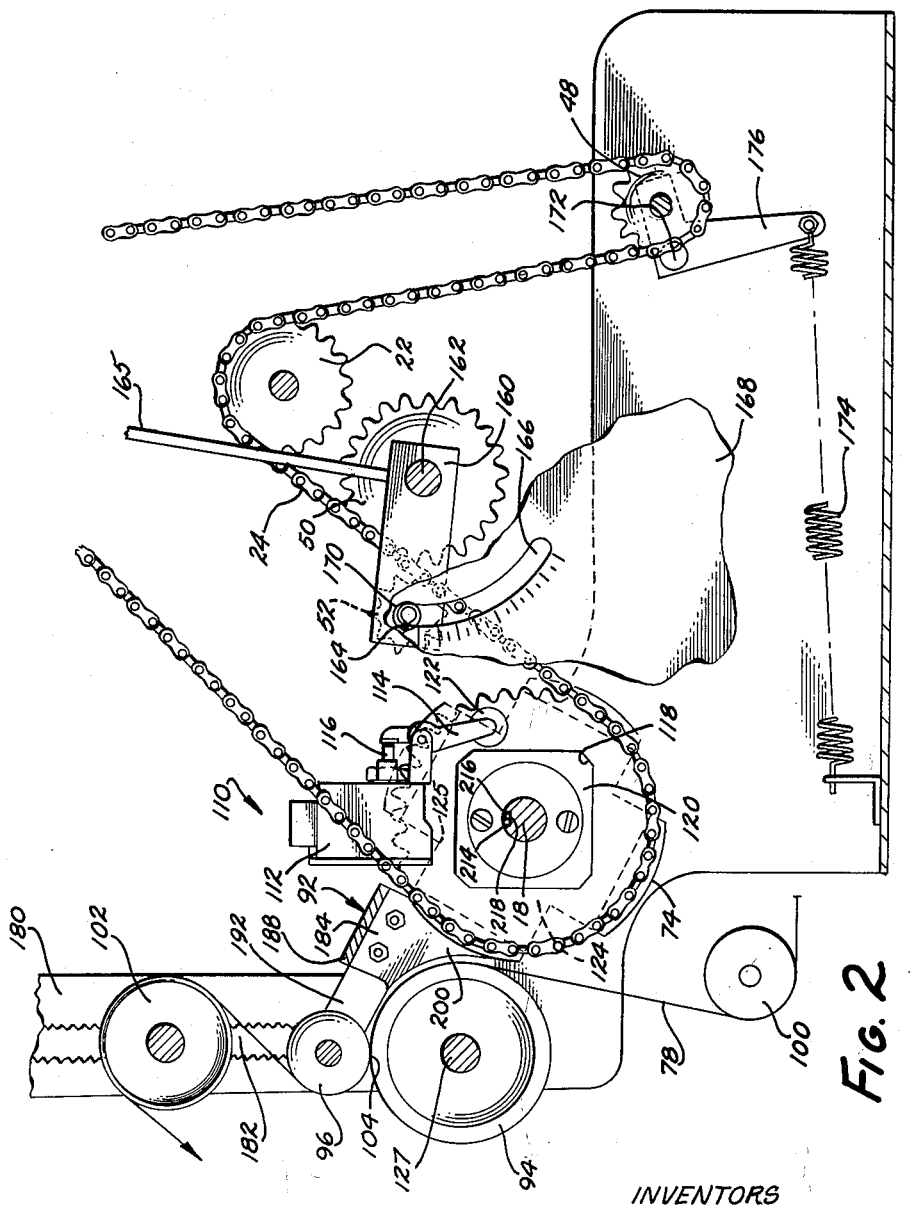
FIG. 2 is an elevation of the left-hand side of the device, partly cut away to show the mechanism.

The proper spacing of labels along the web 78 is assured by a cam-operated switch mechanism generally designated as 110 and best shown in FIG. 2. The mechanism 110 consists of a normally-closed electrical switch 112 operated by an arm 114 which periodically depresses the switch button 116 to open switch 112 as one of the corners 118 of the cam 120 comes in contact with roller 122. The switch 112 is connected into a conventional electrical holding circuit (not shown) in such a manner that the clutch in clutch-and-brake assembly 16 is held engaged whenever switch 112 is closed and is disengaged when switch 112 is opened. An external normally-open demand signal switch (not shown) associated with the mechanism of the packaging machine is connected in parallel with switch 112 to momentarily bypass the switch 112 to engage the clutch of clutch-and-brake assembly 16 at a predetermined moment in the operating cycle of the packaging machine. The demand signal switch continues to bypass switch 112 until switch 112 is closed by the roller 122 riding off a corner 118. The demand signal switch on the packaging machine then opens, but the labeling apparatus continues to operate until the roller 122 rides up onto the next corner 118 of cam 120 to open switch 112. The clutch-and-brake arrangement 16 is so constructed that whenever the clutch is disengaged, the brake is applied to drive shaft 14, and vice versa. Thus, it will be seen that the heater member 124 periodically rotates through a ninety-degree arc and then stops again. Consequently, the minimum spacing between the leading edges of successive labels along web 78 is one-fourth of the circumference of the heater member 124 at the surface of shoes 74; and the maximum spacing is infinity.

As will be apparent from an inspection of FIG. 2, the heater 124 will always stop in a position where corner 125 is on a line joining the centers of shafts 18 and 127, i.e. where no heater shoe 74 is near the impression roller 94.

Figures 5, 7:
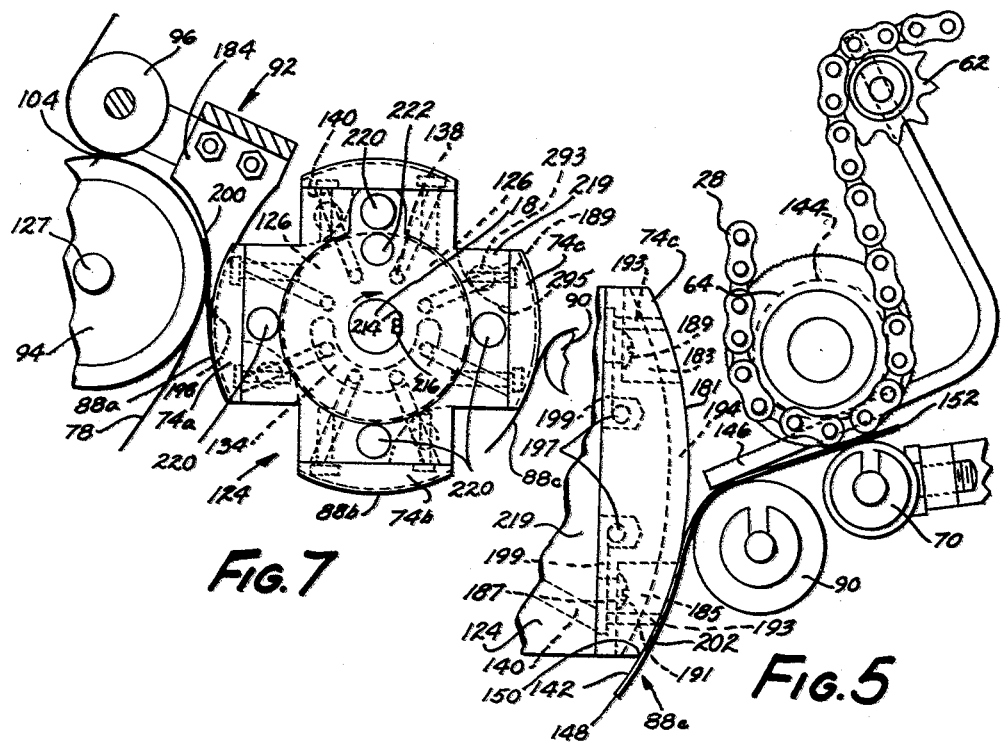
FIG. 5 is a fragmentary elevation along line V—V of FIG. 3.
FIG. 7 is an elevation of the heater means, as indicated by line VII—VII of FIG. 3.

Referring now to FIG. 7, it will be seen that as a hot label 88a is being stripped off from shoe 74a by stripper 92, a new label 88c is being deposited on shoe 74c, while an intermediate label 88b is being held against shoe 74b while it is being heated. When the heater 124 comes to rest due to the action of cam 120, it will be in a position forty-five degrees clockwise from that shown in FIG. 7. In that condition, label 88a will be completely peeled off from shoe 74a and attached to the web 78, and labels 88b and 88c will be attached to their respective shoes 74b and 74c while being heated. Consequently, it will be seen that each label is heated for the duration of two pauses in the rotation of heater 124, plus the length of time necessary to turn heater 124 through a one-hundred-and-eighty-degree arc at its normal speed of rotation, i.e. two full packaging cycles of the packaging machine. It will be apparent that even if the intervals between successive label applications are quite short, ample time is provided for heating the labels 88 to the point where their thermoplastic adhesive coating melts, even though the shoes 74 are kept at a relatively low temperature. Of course, the greater the time interval between label applications (i.e. the longer the packaging cycle), the lower the shoe temperature necessary to achieve melting of the thermoplastic adhesive.

By increasing the number of shoes 74 on the heater 124, the number of cycles during which the label is heated can of course be increased as desired. A significant feature of the inventive construction is that the mechanism of this invention inherently heats the labels for at least one full cycle, whereas the prior art devices inherently had to heat for less than one cycle, usually ½ or ⅔ cycle. (As far as the labeler is concerned, one cycle may be defined as the time elapsing between the application of the leading edge of one label and the application of the leading edge of the next following label.)

Figure 3:
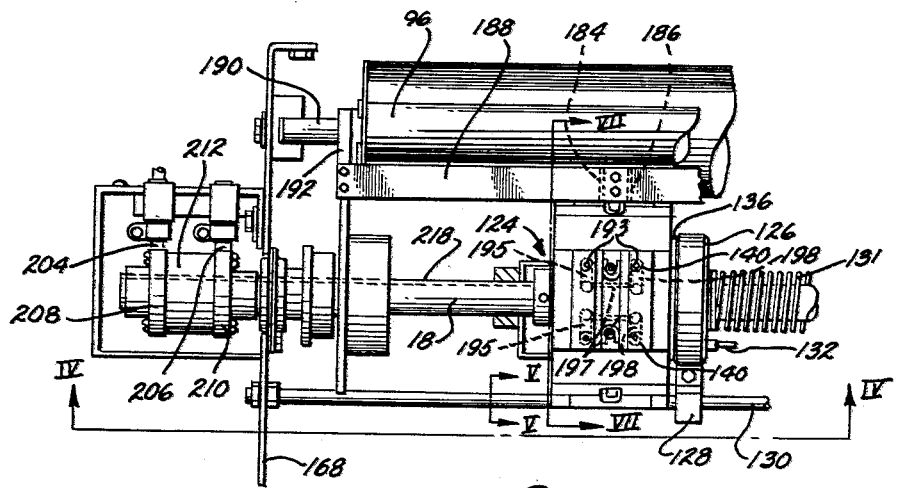
FIG. 3 is a fragmentary plan view of the forward end of the device.

Referring now to FIGS. 5, 7 and 3, the heating and holding of the labels on the heater 124 is accomplished as follows: a stationary graphite disc 126 held against rotation by a clamp 128 attached to shaft 130, and pressed against face 136 of heater 124 by a spring 131, is provided with a semi-circular groove 134 (FIG. 7) which is connected to a vacuum line 132 and opens onto face 136 of the heater 124. As the heater 124 rotates, successive ones of the openings 138 in face 136 of the heater 124 come into a position adjacent the groove 134. The openings 138 are connected through passages 140 to the surface of shoes 74. Thus, in the position of heater 124 shown in FIG. 7, a vacuum is applied to the lower end of shoe 74c, both ends of shoe 74b, and the lower end of shoe 74a; i.e. to all places where a label is in contact with a shoe. It will be noted that the vacuum holds the labels 88 quite firmly radially against the shoes 74. The resulting friction of the paper side 142 (FIG. 5) of the label against the surface of shoes 74 prevents any circumferential movement of the labels 88 with respect to the shoes 74 under normal conditions; however, circumferential slippage of the labels against the shoes is sufficiently easy to permit sliding compensation between the non-uniform label feed movement and the uniform shoe movement at the point where the label is being deposited on the shoe.

Referring for the details of this motion more specifically to FIG. 5, the label 88c is shown in the process of being discharged onto the shoe 74c. The motion transmitted by the chain 28 to the feed roller 64 varies from very slow at the beginning of the feeding cycle to very fast in the middle of the feeding cycle, and very slow again at the end of the feeding cycle, with a complete stop occurring after the end of the feeding cycle while the knife 32 (FIG. 1) severs the next label 88 from the label strip 72. As the label 88c is fed toward the shoe 74c by the serrated feed roller 64, the label is bent around bending roller 90 by bending arm 146 extending through a groove 144 (FIG. 1) in feed roller 64, and leading edge 148 of label 88c is brought into more or less exact register with the leading edge 150 of shoe 74c. However, since the label feed mechanism at this point runs faster than shoe 74c, label 88c is slid along the surface of shoe 74c until it reaches a position like that shown in FIG. 5. At this point, the feed roller 64 slows down to a velocity below that of shoe 74c, so that it now draws the label 88c backwards along the surface of shoe 74c. The motion differential is so adjusted that when the trailing edge 152 of the label 88c progresses out of engagement with the feed roller 64 and the idler roller 70, the leading edge 148 has been drawn back into exact register with the corner 150 of shoe 74c, so that the label 88c will end up in complete register with shoe 74c, as is shown in FIG. 7 for label 88b. The reason for permitting this sliding movement between the paper side 142 of label 88c and the surface of shoe 74c is to avoid the use of any mechanical gripping device which might tear the label 88c because of the difference in motion between it and the surface of shoe 74c.

According to the invention, the final position of label 88 with respect to the surface of shoe 74 is adjustable, while the machine is running, by a mechanism best shown in FIG. 2. Chain 24, which operatively connects the heater 124 and the Geneva drive 22 of the label feed mechanism, is conducted between these two elements over an idler sprocket 50 and under the adjusting sprocket 52. The adjusting sprocket 52 is journaled in a pivot bracket 160 which can be pivoted about a shaft 162 by an adjusting handle 165. The position of the bracket 160 may be indicated by a pointer 164 protruding through slot 166 in the outer housing 168 of the machine, and a locking wheel 170 may be provided to act against casing 168 to lock the bracket 160 in any given position. It will be apparent from a study of FIG. 2 that as adjusting sprocket 52 is moved in a counterclockwise direction along slot 166, the path described by chain 24 between Geneva drive 22 and heater 124 becomes longer and longer. To compensate for this movement, the chain 24 pulls the spring-loaded sprocket 48 upwardly in a counterclockwise direction about pivot 172 against the tension of spring 174 attached to arm 176. It will thus be seen that the movement of adjusting sprocket 52 causes the angular position of Geneva drive 22 with respect to the angular position of heater 124 to change. Consequently, the position at which the label is deposited on the shoes 74 changes also. Thus, the positioning of labels 88 with respect to shoes 74 can be adjusted, while the machine is running, simply by moving the handle 165 to any desired degree.

It should be understood that the adjustment just described is to be used primarily for adjustment of the positioning of the label on the heater shoes, particularly where the use of different sizes of lengths of labels is involved. The location of the label on the finished package, i.e. the register of the label, is adjusted by raising or lowering the register roller 102 in the tracks 180 by means of the gear rack 182 (FIG. 1), as previously described herein.

Figure 4:
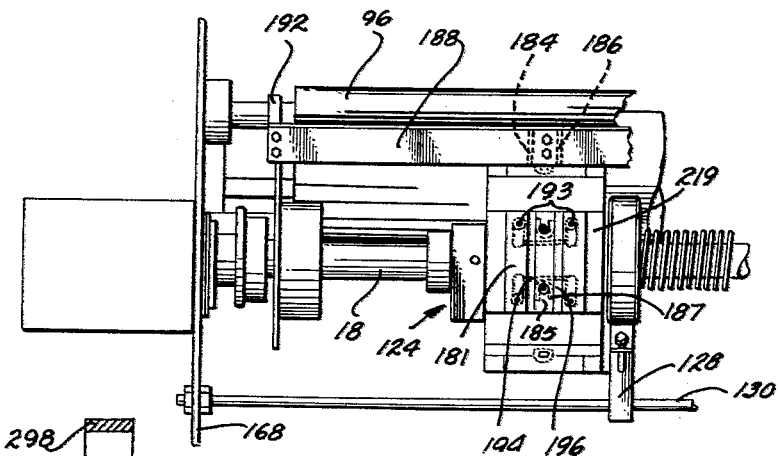
FIG. 4 is a fragmentary elevation of the device taken along line IV—IV of FIG. 3.

The details of the shoe 74 can best be seen in FIGS. 3, 4 and 5. Grooves 194, 196 are formed longitudinally of the shoe 74 in the top surface 181 thereof. Pockets 183, 185 are formed at each end of the shoe 74 in the central portion of the top surface 181. These pockets are provided with U-shaped shoulders 187 which receive the heads of screws 189, 191. The screw 189 is threaded directly into the block 219 of heater 124, and the screw 191 is threaded into a pivot 293 journaled in block 219 in a direction parallel to heater shaft 18. The screw 191 is therefore rotatable in slot 295 formed in the block 219. Thus, the shoe 74 can be slid off the face of block 219 against which it is seated by loosening the screws 189 and 191, and swinging screw 191 out of the path of shoe 74. This arrangement is particularly useful when the shoes have to be exchanged while the heater is hot, as it avoids the direct handling of any hot parts, assuming that a screwdriver is used for loosening the screws and that pliers or other suitable holding tools are used for sliding the shoe away from the heater. Vacuum is applied to the surface 181 through conduits 193, which are connected by conduits 195, 197, 199 to passages 140 in the heater block 219.

As best appears from FIGS. 2 and 7, the path of the packaging material web 78 from the idler roller 100 (FIG. 2) to the impression roller 94 may be such that the web 78 at all times remains spaced from the surface of shoes 74. In that case, the transfer of the label 88a from shoe 74a to web 78, as will be best seen in FIG. 7, is accomplished by the stripper 92 which consists of two spaced plates 184, 186 supported by a crossbar 188 loosely journaled on the weight roller shaft 190 (FIG. 3) by bracket arms 192 so as to ride in the grooves 194, 196, respectively, of the shoes 74. Since the apices 198 of the stripper plates 184, 186 are beneath the surface of shoes 74, a label such as 88a in FIG. 7 will be stripped off the shoe 74a by the edges 200 of the stripper plates 184, 186, and directed against the web 78 by the same edges. The edges 200 guide the label 88a into contact with the web 78 so that its now melted adherent layer (202 in FIG. 5) adheres to the web 78. The linear adherence caused by the edges 200 of the stripper plates 184, 186 is then completed over the entire label surface by compression of the label against the packaging material strip at point 104 where weight roller 96 rides on impression roller 94.

Electrical current is applied to the heating elements 220 of heater 124 by brushes 204, 206 which brush against the rings 208, 210 respectively of the rotor 212. Wires 214, 216 (FIGS. 2, 7) are connected to the rings 208, 210 and are brought over to heater 124 in the groove 218 formed in heater shaft 18. Inasmuch as the heater shoes 74 are designed to be easily removable, all heating elements are contained within the block 219 of heater 124, and the heat generated thereby is transferred to the shoes 74 by metal-to-metal conduction. An adjustable thermostat 222 in block 219 may be provided to control the heater temperature.

*Operation*

In operation, a web of packaging material 78 is threaded from an appropriate supply roller (not shown) under idler rollers 98 and 100, between weight roller 96 and impression roller 94, and over register roller 102 into the packaging machine (not shown). The mechanism of the packaging machine is then set to close the demand signal switch of the packaging machine once or more during each packaging cycle, depending on how many labels are to be affixed to each package. A label strip 72 is then threaded through the label feed mechanism in the usual manner, and the machine is cycled through a few cycles to ascertain that the labels are being deposited in the proper places on the heater shoes 74 so as to be properly heated over their entire surface. This adjustment can be continuously varied, while the machine is running, by manipulating the adjusting lever 165. Next, the register roller 102 is raised or lowered by means of the gear rack 182 until the label appears in the proper place on the packaged product. Once the controls have been thus set, the labels will accurately maintain their position and register regardless of the speed of operation of the packaging machine. Once during each cycle of the packaging machine, the heater 124 of the labeling machine rotates through 90 degrees and then stops. During each 90 degree rotation, the stripper 92 applies a hot label to the packaging material web; a second label, in the process of being heated, moves into position for the next applying movement; and a third label is deposited onto a heater shoe for heating. Because of the relatively long contact between the labels and the heater shoes, the heater shoes can be operated at a comparatively low temperature so as to heat the labels just enough to provide good adherence without damaging the packaging material web or label. By the same token, the long heating process permits much faster operation of the labeler than was heretofore possible. Inasmuch as the rotational speed of the heater does not depend on the spacing of the labels, but only on the speed of operation of the packaging machine, it is possible to adjust the temperature of the heater so that the adhesive on the label solidifies almost instantly after contacting the packaging material strip.

It will be seen that we have provided a continuous-web labeling machine capable of safely handling a wide range of packaging materials at speeds in excess of those heretofore possible with machines of this type.

Obviously, the concepts of this invention can be embodied in many different forms, and the embodiment shown in the drawings is to be taken as illustrative only. The invention therefore is not to be deemed to be limited to the embodiment shown, but only by the scope of the following claims.

We claim:

1. A high speed heater type labeling machine comprising: continuous packaging web feeding means; a rotational label heater means adjacent one portion of said web feeding means; said heater means comprising a rotationally mounted shaft having a plurality of heater shoes mounted around its periphery, including one shoe for contacting a freshly cut label to retain it, a second shoe for applying and releasing a heated label to a packaging web, and a third shoe intermediate said first and second shoes for retaining a label in heating relationship, each shoe being internally heated and having suction label holding means for retaining the labels by contact with the non-adherescent side of the labels; said packaging web feeding means including web guide means adjacent one side of said rotational heater means; intermittent drive means operatively connected to said heater means; label strip feeding means including guide means adjacent said heater means and generally opposite to said packaging web guide means for contacting said one shoe with a freshly cut label to retain it, applying and releasing another heated label from said second shoe by operative association with the packaging web, and retaining said intermediate third shoe in heating relationship with a third label to achieve heating for greater than one label application cycle; and cutter means adjacent said heater means to sever labels of selected length from the label strip for application to said heater shoes.

2. The machine in claim 1, being highly adaptable for application of labels of differing length from the label strip, wherein said label strip feeding means includes an exchangeable, rotatably mounted index feed control drum to feed variable label strip lengths to said heater shoes.

3. The machine in claim 2 wherein said rotatable heater means and said feed control drum are both operably associated with intermittent drive means, and said drum and heater means and rotatably adjustable with respect to each other to readily accommodate varying label lengths.

4. The machine in claim 1 wherein a label stripper-application blade is positioned between said second shoe of said heater means and said portion of said packaging web feeding means including an edge to peel the label from said third shoe, and a contact guide surface to press the label against the packaging web.

References Cited in the file of this patent
UNITED STATES PATENTS

| | | |
|---|---|---|
| 2,244,140 | Caldwell | June 3, 1941 |
| 2,335,033 | Tompkins | Nov. 23, 1943 |
| 2,525,741 | Von Hofe et al. | Oct. 10, 1950 |
| 2,527,272 | Lyon et al. | Oct. 24, 1950 |
| 2,543,004 | Dewyer | Feb. 27, 1951 |
| 2,583,161 | Urbano | Jan. 22, 1952 |
| 2,878,953 | Mitchell | Mar. 24, 1959 |